United States Patent
Bauer et al.

(10) Patent No.: US 9,488,818 B2
(45) Date of Patent: Nov. 8, 2016

(54) IMMERSION OBJECTIVE FOR MICROSCOPES AND USE THEREOF

(71) Applicant: Leica Microsystems CMS GmbH, Wetzlar (DE)

(72) Inventors: Tobias Bauer, Koenigstein/Taunus (DE); Christian Schulz, Solms (DE)

(73) Assignee: LEICA MICROSYSTEM CMS GMBH, Wetzlar (DE)

(*) Notice: Subject to any disclaimer, the term of this patent is extended or adjusted under 35 U.S.C. 154(b) by 78 days.

(21) Appl. No.: 14/191,557

(22) Filed: Feb. 27, 2014

(65) Prior Publication Data

US 2014/0247502 A1    Sep. 4, 2014

(30) Foreign Application Priority Data

Mar. 4, 2013  (DE) .................. 10 2013 203 628

(51) Int. Cl.
*G02B 21/02* (2006.01)
*G02B 21/33* (2006.01)

(52) U.S. Cl.
CPC .............. *G02B 21/02* (2013.01); *G02B 21/33* (2013.01)

(58) Field of Classification Search
CPC .. G02B 13/0025; G02B 21/02; G02B 21/33; G02B 2003/0093; G02B 3/02; G02B 3/04; G02B 3/06

USPC ........................................................ 359/661
See application file for complete search history.

(56) References Cited

U.S. PATENT DOCUMENTS

| | | | |
|---|---|---|---|
| 3,572,902 A * | 3/1971 | Uetake | 359/658 |
| 5,898,524 A * | 4/1999 | Ryzhikov | 359/657 |
| 6,417,974 B1 | 7/2002 | Schuster | |
| 7,046,451 B2 | 5/2006 | Mandai et al. | |
| 7,199,938 B2 | 4/2007 | Fujimoto et al. | |
| 2002/0154414 A1 | 10/2002 | Matthae et al. | |
| 2006/0012885 A1* | 1/2006 | Beder et al. | 359/649 |
| 2006/0077789 A1* | 4/2006 | Shinoda et al. | 369/44.23 |
| 2006/0203354 A1* | 9/2006 | Fujimoto et al. | 359/660 |
| 2008/0316455 A1* | 12/2008 | Hellweg et al. | 355/67 |
| 2010/0321678 A1* | 12/2010 | Koh et al. | 356/237.5 |
| 2012/0113534 A1* | 5/2012 | Arata et al. | 359/813 |

FOREIGN PATENT DOCUMENTS

| | | |
|---|---|---|
| DE | 19929403 A1 | 12/2000 |
| DE | 10200243 A1 | 7/2003 |

* cited by examiner

*Primary Examiner* — Jordan Schwartz

(74) *Attorney, Agent, or Firm* — Leydig, Voit & Mayer, Ltd.

(57) ABSTRACT

A microscope immersion objective having a numerical aperture of NA>1.36 includes a front lens group. The front lens group has a first, object-side optical element having a plane parallel plate and a second optical element having a hyper-hemisphere. The plane parallel plate is wrung together with a planar side of the hyper-hemisphere.

13 Claims, 8 Drawing Sheets

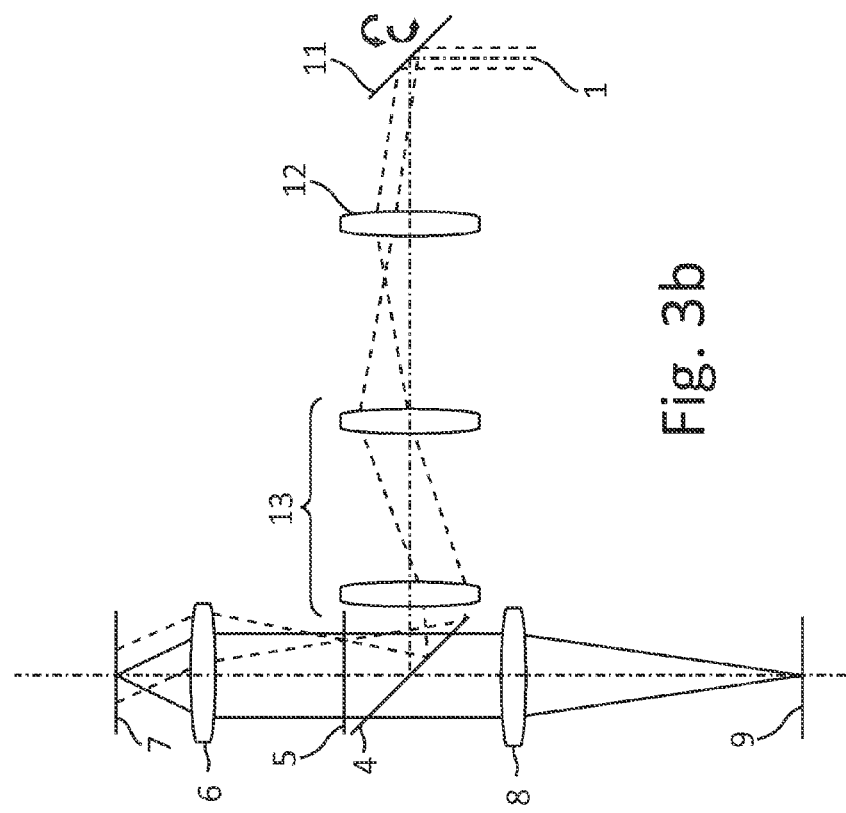
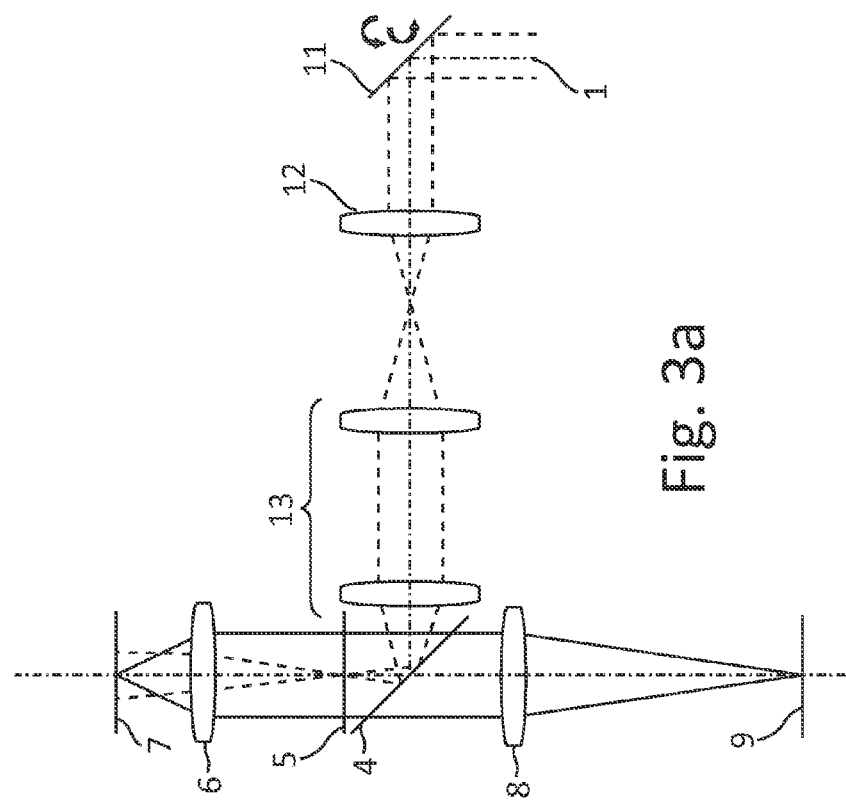

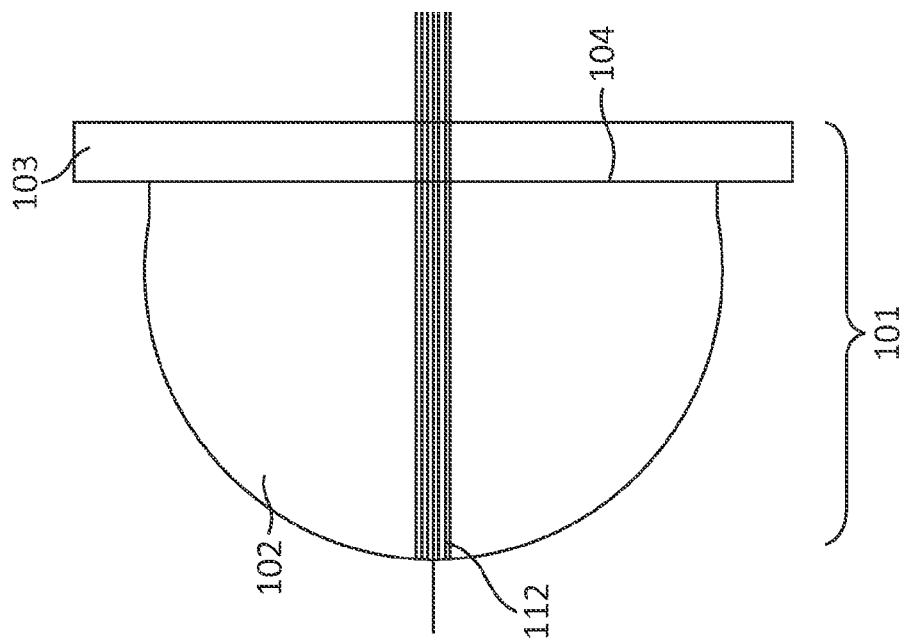
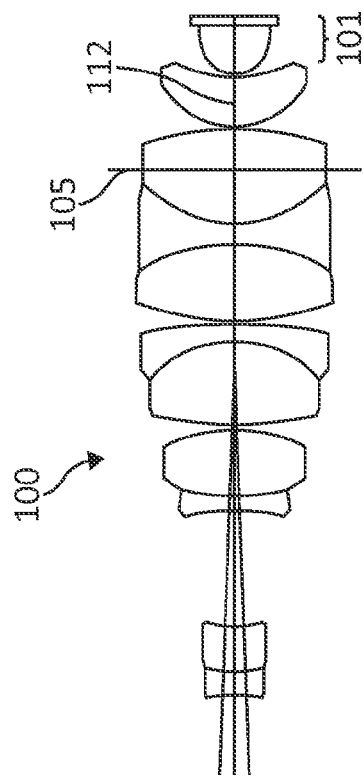
Fig. 4b
Fig. 4a

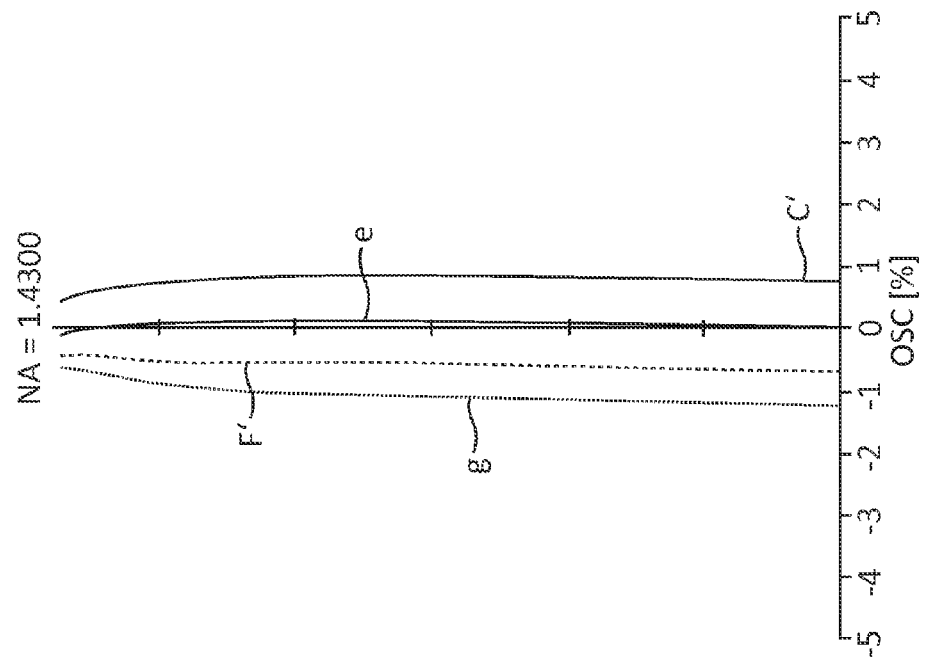
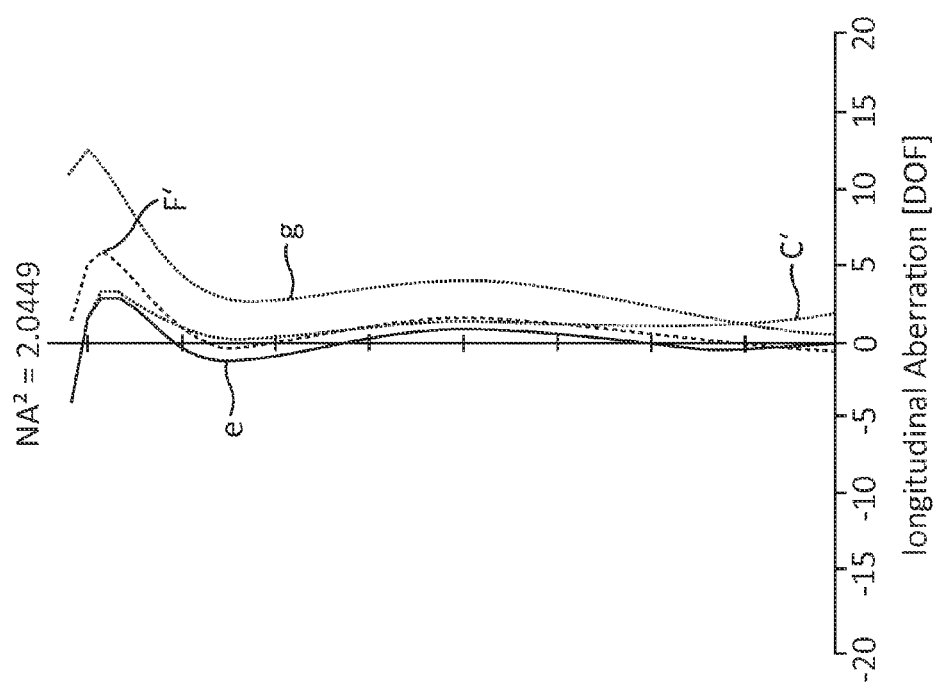

IMMERSION OBJECTIVE FOR MICROSCOPES AND USE THEREOF

CROSS REFERENCE TO RELATED APPLICATIONS

This application claims priority from German Patent Application No. DE 10 2013 203 628.0, filed Mar. 4, 2013.

FIELD

The invention relates to immersion objectives for microscopes and in particular to immersion objectives for microscopes that have a numerical aperture of NA>1.36.

BACKGROUND

Immersion objectives for microscopes can include an immersion fluid introduced between the objective and the preparation, thereby increasing the achievable resolution, so that there is no empty magnification, not even at high magnifications. A further effect is the suppression of contrast-reducing reflections, in particular when an immersion oil is used which has approximately the same refractive index as glass. An oil immersion objective having a numerical aperture of NA=1.4 produces, for example, a maximum resolution of 217 nm at a wavelength of 500 nm. The upper threshold for the numerical aperture is dictated by the refractive index of the immersion medium, which is typically 1.518 with oil.

A field in which oil immersion objectives are commonly used is fluorescence microscopy. Care should be taken in this case to ensure that the immersion oil used does not have its own fluorescence.

Conventional oil immersion objectives are generally distinctive in that the lens group closest to the object ("front lens group") consists of at least two cemented lenses. Upon cementing, adjacent lens faces, which must have the same radii, are stuck together using a thin, transparent cement layer. The cement layer, which is mainly made of synthetic resin, is also used to prevent total internal reflection (and reflections in general) at glass-air surfaces between two lenses without cement. The cements used are, however, disadvantageous in a number of microscopy applications. In some microscopic methods, in particular in fluorescence microscopy, high-performance laser illumination is operated. Particularly in methods which focus the laser light into the objective, this leads to a higher intensity within the objective, especially in the region of the front lens group. Cements used at this location may incur damage when irradiated at such high intensities. This results in turbidity at the damaged cement site.

Furthermore, cements have a specific own fluorescence. This is disadvantageous in methods in (wide-field) fluorescence microscopy, since much of the fluorescence light occurring in the cement also enters the image and therein reduces the contrast of the useful light from the fluorescing sample.

U.S. Pat. No. 7,199,938 B2 discloses an apochromatic immersion objective for microscopes which has an object-side front lens group composed of cemented lenses. This front lens group consists of a planoconvex lens element, the planar surface of which faces the object, and of a meniscus lens element, the concave face of which faces the object-side and is connected to the convex side of the planoconvex lens element by means of cementing. The objective envisaged in said document is intended to reach a numerical aperture of NA>1.4.

US 2002/0154414 A1 discloses a microscope objective of high aperture for immersion applications, in particular TIRF (Total Internal Reflection Fluorescence). The front lens group comprises a first lens of positive refractive power having a planoconvex surface, the planar face facing the object. This lens is cemented to a second lens, which surrounds the convex face of the first lens and has negative refractive power.

Furthermore, U.S. Pat. No. 7,046,451 B2 discloses an oil immersion objective for microscopes having a numerical aperture of NA>1.45, the first, object-side (front) lens group of which likewise comprises a first planoconvex lens, the planar face of which faces the object, the planoconvex lens being cemented to a meniscus lens, the convex face of which faces the image-side. TIRF microscopy is cited as the field of application in this case too. The numerical aperture is intended to be NA≥1.46 in this case.

A known construction principle, which is also shared by the above-mentioned oil immersion objectives, for producing high apertures is to embed the planoconvex, object-facing lens in a second lens by means of cementing. Yet cementing lenses is marred by the above-mentioned disadvantages.

SUMMARY OF THE INVENTION

A microscope immersion objective is provided herein having a numerical aperture of NA>1.36, the microscope immersion objective comprising a front lens group including a first, object-side optical element having a plane parallel plate and a second optical element having a hyper-hemisphere, wherein the plane parallel plate is wrung together with a planar side of the hyper-hemisphere.

A microscopy method is provided herein comprising providing a microscope immersion objective having a numerical aperture of NA>1.36, the microscope immersion objective comprising a front lens group including a first, object-side optical element having a plane parallel plate and a second optical element having a hyper-hemisphere, wherein the plane parallel plate is wrung together with a planar side of the hyper-hemisphere; and using the microscope immersion objective for one of localizing microscopy or TIRF microscopy.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 schematically shows typical illumination for localisation microscopy (FIG. 3a) and for TIRF microscopy (FIG. 3b).

FIG. 4 shows a beam path through an objective, according to an embodiment of the invention, for the set-up according to FIG. 3a in a general view (FIG. 4a) and in a detailed view of the front lens group (FIG. 4b).

FIG. 7 finally shows the imaging power of such an objective, namely the longitudinal aberration (FIG. 7a) and offence against sine-condition (FIG. 7b).

DETAILED DESCRIPTION

Figure 1:
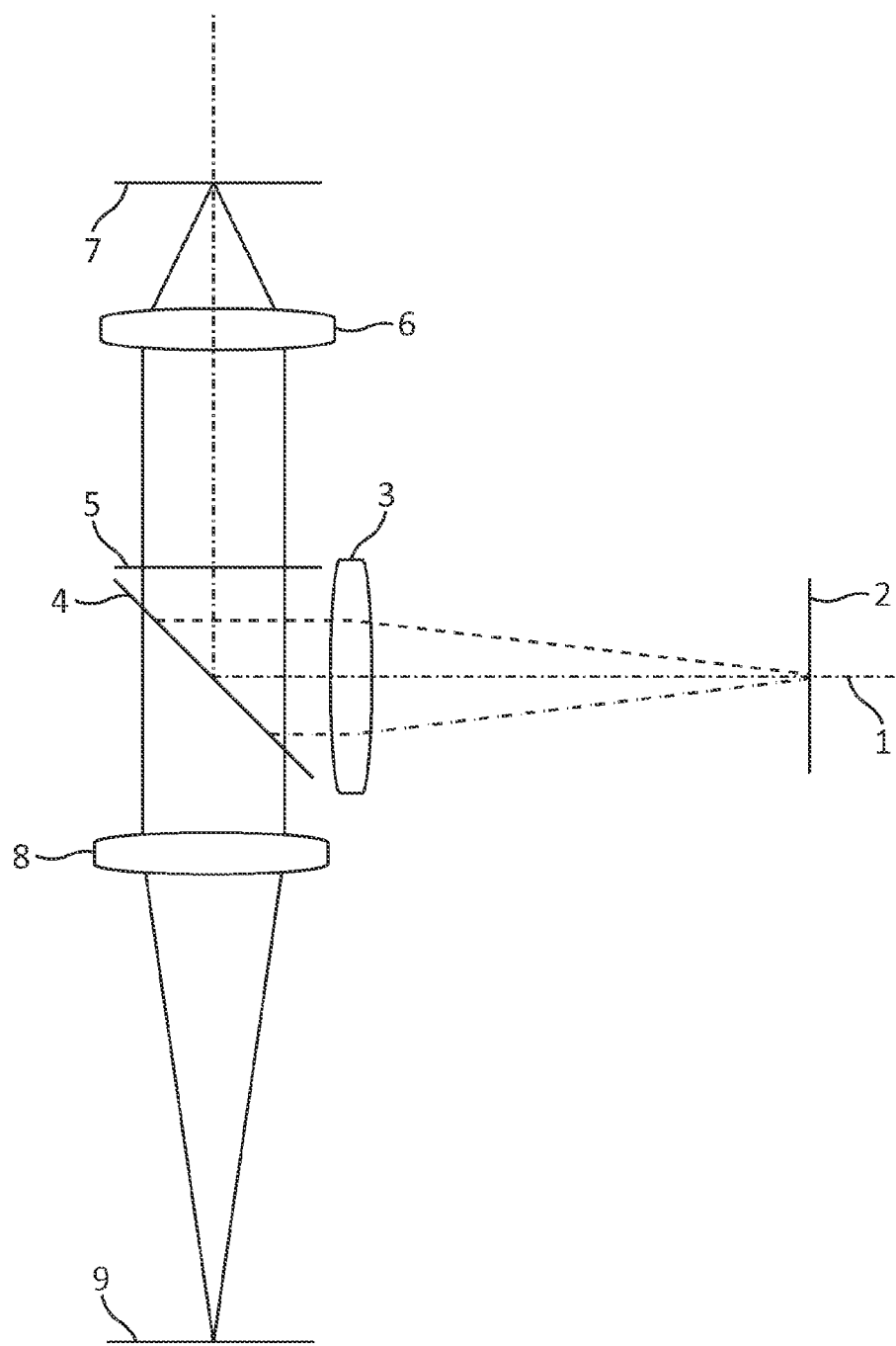
FIG. 1 schematically shows the microscopy set-up in a standard wide-field method in fluorescence microscopy.

An aspect of the present invention provides an immersion object for microscopes which has a high numerical aperture of NA>1.36 and circumvents as far as possible the disadvantages (damage to the cement at high irradiation intensities and/or own fluorescence of the cement) associated with the use of cements.

Without limiting the generality, the following will consider the practically relevant case of an oil immersion objective. Other possible oil immersion media are water, glycerine or silicone oil. However, the present invention is also suitable for other immersion media.

An immersion objective for microscopes, according to an embodiment of the invention, having a numerical aperture of NA>1.36 has a front lens group, that is, a lens group which directly faces the object, which comprises a plane parallel plate as a first, object-side optical element and a hyper-hemisphere as a second optical element, the plane parallel plate being wrung together with the planar side of the hyper-hemisphere.

A person skilled in the art of optics knows the term "hyper-hemisphere". This is a segment from a sphere having an aperture angle which exceeds 180 degrees, that is, which exceeds the vertex. An example of such a hyper-hemisphere is shown in FIG. 2b.

It is intended that the following, as aforesaid in the introduction to the description, will explain an embodiment of the invention in relation to the specific case of an oil immersion objective. However, embodiments of the invention are expressly not limited to oil immersion objectives; other immersion media can also be used in the objective according to embodiments of the invention.

An objective according to an embodiment of the invention embodies a new approach in the field of oil immersion objectives, wherein the plane parallel plate, as the first, object-side optical element, necessitates an entirely new design for the entire objective. The use of a plane parallel plate allows the second optical element of the hyper-hemisphere to be wrung together. In the technique for wringing together, which is known per se, two smooth, planar surfaces, free from dirt particles, are brought together with an exact fit and thereafter remain rigidly interconnected as the sole result of molecular forces of attraction. The connection of the plane parallel plate to the planar side of the hyper-hemisphere needs to be strong and stable. Since it is no longer necessary to cement said optical elements of the front lens group to one another, said disadvantages of the chance of cement damage due to high light intensity and of the own fluorescence of the cement disappear. Surprisingly, it has been found that the associated advantages outweigh any disadvantages of the new objective design (need for new objective construction and possible optical worsening due to the new objective).

DE 199 29 403 A1 proposes for another type of objective, namely for an objective for a semi-conductor lithography projection-exposure installation, wringing a thin equidistant plate together with another optical element. This thin equidistant plate is what is known as a closing plate, which seals the objective and protects it from contamination. This closing plate is free from fittings and replaceably wrung together with the other optical element.

DE 102 00 243 A1 discloses a general method for wringing an optical element together with a counter element. In this process, the counter element is, for example, deformed by means of a piezoceramic material, such that its surface shape no longer directly corresponds to the surface shape of the optical element. Once the optical element has been applied to the counter element, the change to the surface shape is steadily neutralised, until the two elements have been wrung together.

Advantageously, the plate parallel plate projects beyond the planar side of the hyper-hemisphere. This allows for the option of the front lens group being mechanically held on or fixed to the projecting plane parallel plate. In principle, the reverse scenario is also feasible, whereby mechanical fixing to the hyper-hemisphere takes place if said sphere projects beyond the plane parallel plate.

The objective magnification with the oil immersion objective according to an embodiment of the invention is 50× to 200×, preferably 100× to 160×.

It has been found that the numerical aperture of the oil immersion objective according to an embodiment of the invention can be NA>1.40. More particularly, apertures of 1.43, 1.44 or 1.45 can be obtained.

The thickness of the plane parallel plate is intended to be 1 mm at most. Moreover, values below 0.6 mm are advantageous 0 4 mm are expedient as a lower threshold.

The oil immersion objective according to an embodiment of the invention is a plan apochromatic objective. As is known, this constitutes an objective that corrects chromatic aberrations and flattens out the image field, even in edge regions. This is a huge advantage particularly when used in TIRF microscopy. The entire visual range of an immersion objective according to an embodiment of the invention is apochromatically useful.

The oil immersion objective according to an embodiment of the invention consists of three lens groups G1, G2 and G3. In this arrangement, the first lens group G1 constitutes the front lens group, that is, primarily the hyper-hemisphere plus the plane parallel plate wrung together therewith. The second lens group G2 consists of a unipotential lens and cemented lenses having a total of three cemented surfaces (that is, for example, three doublets, or one doublet and one triplet). The third lens group G3 includes the remainder of the objective, which comprises at least four lenses having at least two cemented surfaces. Lens group G3 does not conventionally contain more than six lenses.

An oil immersion objective, according to an embodiment of the invention, which is apportioned as stated into lens groups G1 to G3 is expedient for an advantageous correction of image aberrations, provided that the following three conditions are met. Below, f stands for focal length:

$$3.0 < f(G1)/f(\text{objective}) < 4.0$$

$$6.0 < f(G2)/f(\text{objective}) < 7.0$$

$$-15.5 < f(G3)/f(\text{objective}) < -14.5.$$

An oil immersion objective according to an embodiment of the invention is suited to localisation microscopy and to TIRF microscopy. Generally speaking, an objective according to an embodiment of the invention can also be used in all other fluorescence microscopy methods.

Localisation microscopy methods are distinctive in that, when capturing an image, only a few object points ever simultaneously emit light. If the points are much further apart than the optical resolution, then it is possible to use mathematical focal point determination methods to determine the location of these points with a greater degree of precision than the optical resolution of the objective used. If many of these individual images, each projecting separate object points, are added together, then the entire object can ultimately be shown as an image in super-resolution. Known embodiments of such methods differ with respect to the manner in which it is ensured that only a few object points simultaneously emit light. Names for such methods include PALM, STORM and GSDIM. The last method will briefly be described in the following.

GSDIM stands for "Ground state depletion microscopy followed by individual molecule return". For this method, fluorophores having dark states are used. First, a dye molecule is brought from a ground state to an excited state through being irradiated at an appropriate laser power. The excited state is followed by a transition to the dark state, this dark state having a considerably longer life (approx. 100 ms) than the excited singlet state (of approx. only 3 ns), meaning that the molecules in the dark state accumulate at sufficient light intensity. From the dark state, the molecules return via spontaneous emission to the ground state. Individual images from these spontaneous emissions are captured, it being possible to use the aforesaid mathematical methods to determine the locations of the spontaneous emissions with a greater degree of precision than the optical resolution. The achievable resolution is between 20 and 25 nm, and generally below 60 nm. The achievable resolution also depends on the laser power and on the resolution of the camera used.

The main technical requirement for carrying out GSDIM is the fluorescence excitement of the preparation at a higher luminous power. This can take place by means of suitable laser illumination. This, in turn, can be facilitated by a TIRF illuminating device, which focuses the laser beam into the objective pupil (rear objective focal plane). This has the advantage of achieving homogeneous lighting of the preparation with greater depth of focus of the illumination. To optimally harness the luminous power of the laser, the beam cross-section of the laser is reduced to the extent that the lit-up preparation field then only equates to approximately one quarter compared with TIRF illumination (for example, the diameter of the lit-up preparation field is approximately 60 μm when using an objective having 100-times magnification, whereas this diameter is approximately 250 μm with TIRF illumination).

The following brief comments relate to TIRF microscopy. Conventionally, an inverse light microscope having an oil immersion objective with a very high numerical aperture is used in order to achieve the flat angle of incidence required for total internal reflection. Total internal reflection takes place at the interface from the cover glass to the preparation. What is known as an evanescent field forms in the region behind the cover glass and its intensity decays exponentially with the depth of the preparation. For visible light, the typical penetration depth is 100 to 200 nm. If there are fluorescing molecules within this region which are able to absorb the light from the radiated wavelength, then said molecules are excited for the emission of fluorescence light. Since the observed layer in the preparation is only 100 to 200 nm thin, a significantly higher resolution can be achieved along the optical axis of the objective than with normal fluorescence microscopy (layer regions of typically 500 nm). With TIRF microscopy, the excitation light is coupled into the edge of the objective so as to fall onto the cover glass at the required flat angle.

Needless to say, the features mentioned in the foregoing and those explained hereinafter can also be used in other combinations aside from those given, as well as in isolation, without departing from the scope of the present invention.

Two advantages of embodiments of the invention will be described. First, in fluorescence microscopy, no own fluorescence may be produced in the otherwise conventional cement layer between two optical faces (embodiments in relation to FIGS. 1 and 2). Second, with microscopy methods generating a very high light energy density at the site of contact between two optical faces, the otherwise conventional cement between these faces is not damaged (see the embodiments in relation to FIGS. 3, 4 and 5).

FIG. 1 shows the microscopy set-up in a standard wide-field method in fluorescence microscopy with illumination at full aperture. The light from the light source, for example from a gas discharge lamp, is processed using suitable lighting optics in such a way that a light field diaphragm aperture 2 conjugated with respect to the preparation 7 is homogeneously lit up. The optical axis is denoted 1 in FIG. 1. An illumination lens 3 collimates the light exiting the light field diaphragm, which light is guided by a splitter mirror 4 into the objective 6. Conventionally, the splitter mirror 4 is fitted out as a dichroic splitter mirror having an upstream excitation filter and a downstream emission filter, mainly in the form of a fluorescence filter block. In this arrangement, the excitation filter selects excitation wavelengths from the illumination light, whereas the emission filter transmits the fluorescence emission light exiting the object, in order to increase contrast, and blocks other wavelength ranges. This generally known set-up has not been shown in detail in FIG. 1 for the sake of simplicity.

The objective 6 projects the light onto the preparation 7. As this occurs, the whole of the entrance pupil 5 of the objective 6 is typically filled with light. The emission light emitted by the fluorescing preparation 7 reaches the tube lens 8 via the objective 6, the dichroic beam-splitter 4 and the emission filter, which is conventionally connected therebehind. This results in the generation of an image of the preparation 7 in the image plane 9.

As will be explained with reference to FIGS. 2a and 2b, the fact that the whole of the entrance pupil 5 of the objective 6 is lit up means that light penetrates a large region in the front group of the objective. If the relevant lens faces of the front group are now connected by cement, the cement will show own fluorescence. Depending on the wavelength spectrum, all or some of the emission light occurring in the cement layer can pass through the splitter mirror 4 and the emission filter and reach the image plane 9, where it reduces the contrast of the image which is generated by the fluorescence emissions from the preparation.

Figure 2A:
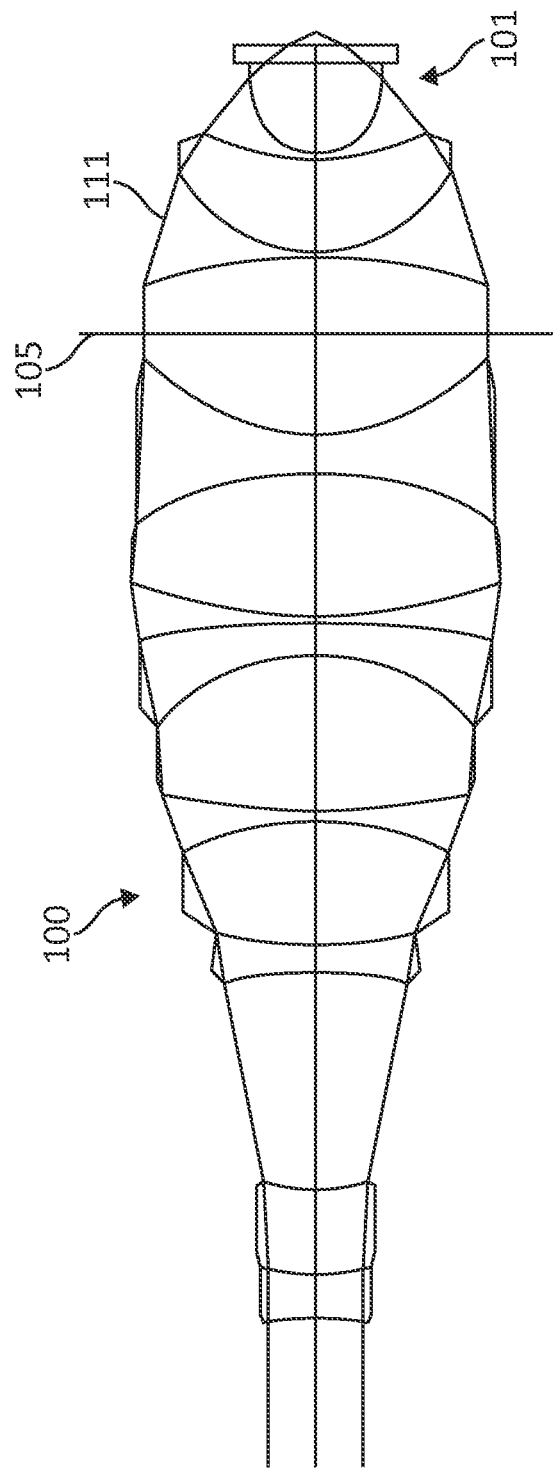
FIG. 2 shows an objective according to an embodiment of the invention in a general view (FIG. 2a) and the front lens group thereof in a detailed view (FIG. 2b).
Figure 2B:
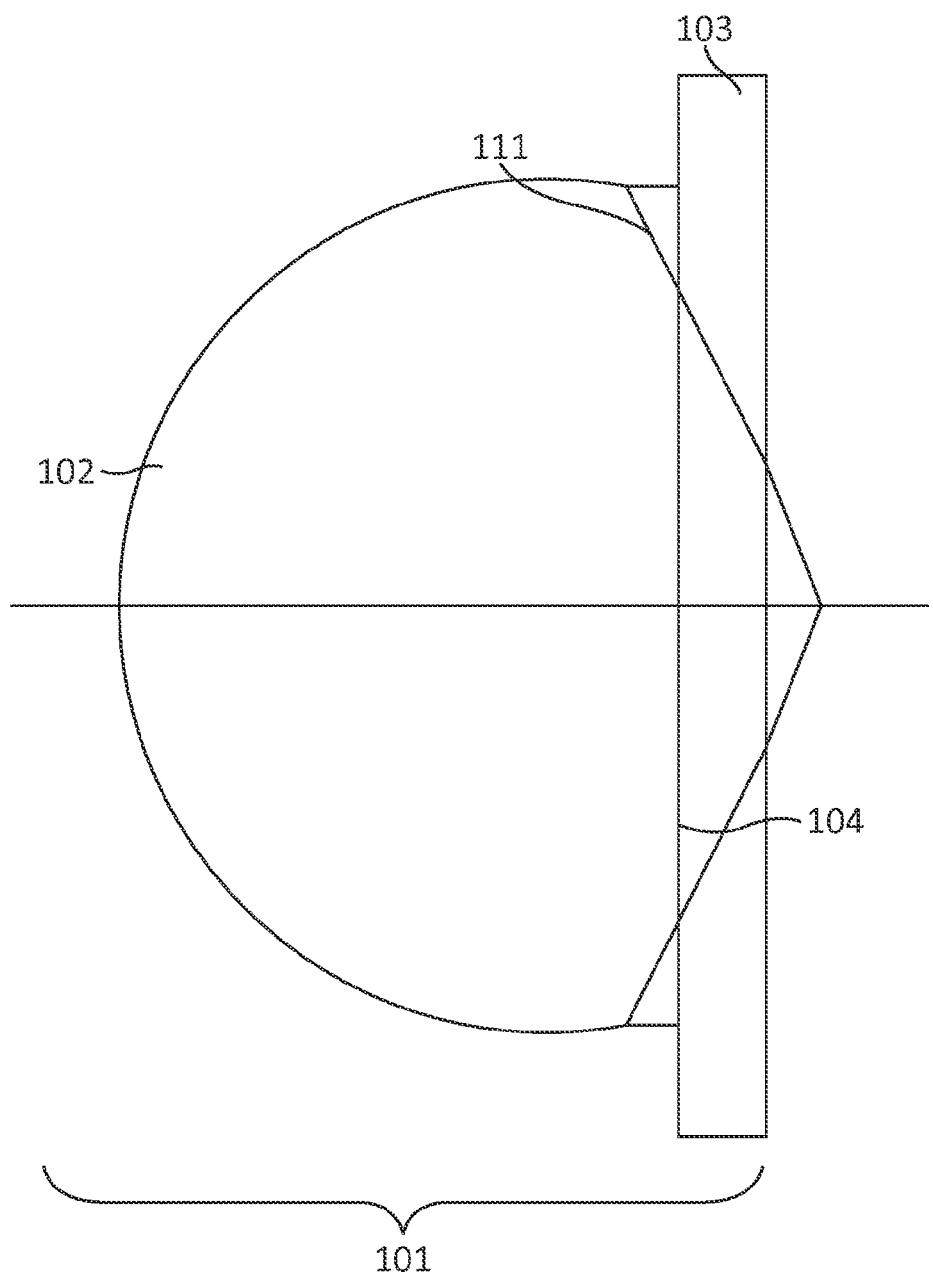

If, by contrast, an objective according to an embodiment of the invention and as shown in FIGS. 2a and 2b is used, the two front object-side optical elements are not connected by cement, but are optically contacted (wrung together). As a result, no disturbing emission light can be produced by own fluorescence.

FIG. 2a shows the beam path 111 in an oil immersion objective 100 according to an embodiment of the invention. The set-up also corresponds to that shown in FIG. 1. The front lens group of the objective 100 is denoted 101. The pupil of the objective is denoted 105. FIG. 2b shows a portion concerning the front lens group 101 from FIG. 2a. The front lens group 101 comprises a plane parallel plate 103, also referred to as a small plane plate, and a hyper-hemisphere 102, the small plane plate 103 being wrung together with the planar side of the hyper-hemisphere 102. The contact surface is denoted 104. It can be seen from FIG. 2b that light penetrates over a large region of this contact surface 104 in the direction of the preparation 7 (cf. FIG. 1). Due to the absence of cement along the contact surface 104, said own fluorescence is avoided.

FIG. 2b shows that the plane parallel plate 103 protrudes laterally beyond the planar face of the hyper-hemisphere 102. This set-up has two advantages: first, the plane parallel plate 103 allows for simple mechanical retention of the front group; second, the combination of hyper-hemisphere lens and small plane plate offers advantages in the optical correction of the objective.

The above-mentioned second essential advantage makes itself felt in microscopy methods in which high energy densities enter the objective. Typical examples of such microscopy methods are localisation microscopy and TIRF microscopy, both of which are fluorescence microscopy methods. These methods will be explained in the following with reference to FIGS. 3 to 5.

Common to the two methods mentioned is the focusing of the excitation light into the entrance pupil 5 of the objective 6. This focusing can either take place onto a point of the optical axis 1, as in drawing 3a, or be laterally offset therefrom, as shown in FIG. 3b. The same reference numerals as in FIG. 1 denote like components. In this respect, reference is made to the embodiments in connection with FIG. 1. In contrast to FIG. 1, the illumination light first reaches a tilting mirror 11 and, from there, a scanocular 12, which focuses the light onto a point which is conjugated with respect to the entrance pupil 5 of the objective 6. By means of a transport optics 13, the light is focused into the entrance pupil 5 at a location of the optical axis 1 (or in the vicinity thereof). An illumination of small aperture is produced close to the optical axis.

Proceeding from FIG. 3a, FIG. 3b shows a suitable set-up for TIRF microscopy, which differs from that according to FIG. 3a basically only in that the tilting mirror 11 guides the illumination beam path out of the optical axis 1, the optics consisting of the scanocular 12 and the transport optics 13 ensuring implementation of the tilt of the mirror 11 defined in a lateral offset at the site of the rear focal plane 5 of the objective 6. The set-up according to FIG. 3b results in an illumination of small aperture at a large angle of incidence. Switching between illumination for localisation microscopy (FIG. 3a) and for TIRF microscopy (FIG. 3b) is simple: a telescope which reduces the beam diameter is folded, in front of the tilting mirror 11, into the beam path when switching to localisation microscopy. This results in a reduction in the size of the circle lit up in the preparation, whereby the power density can be greatly increased.

The set-up according to FIG. 3a generates an illumination beam path which illuminates, with high power densities, the preparation 7 in a small region about the optical axis 1. For the above-mentioned reasons, localisation microscopy methods require such high illumination intensities. FIG. 4 shows in detail the relevant beam path through the objective.

The beam path shown in FIG. 3b illuminates the preparation 7 at a large angle of incidence, as is required for the above-mentioned TIRF microscopy. The course of the beam through the objective is shown in FIG. 5.

FIG. 4 shows the beam path in a set-up according to FIG. 3a through an oil immersion objective 100 according to an embodiment of the invention. The reference numerals correspond to those from FIG. 2; in this regard, reference is made to explanations of FIG. 2. An illumination beam path 112 of small aperture is clearly visible close to the optical axis. By contrast, FIG. 4b is an enlarged view of the front lens group 101. The beam path 112 penetrates only a very small region, about the optical axis, of the contact surface 104 between the plane parallel plate 103 and the hyper-hemisphere 102. All the light energy is, therefore, concentrated in this small region, resulting in high power densities. These high power densities can cause damage to the cement in a cemented surface on the contact surface 104. Such damage causes "blind spots", which impair the quality of both the image formation and the illumination. Due to the absence of cement on the contact surface 104, these disadvantages are prevented.

Figure 5B:
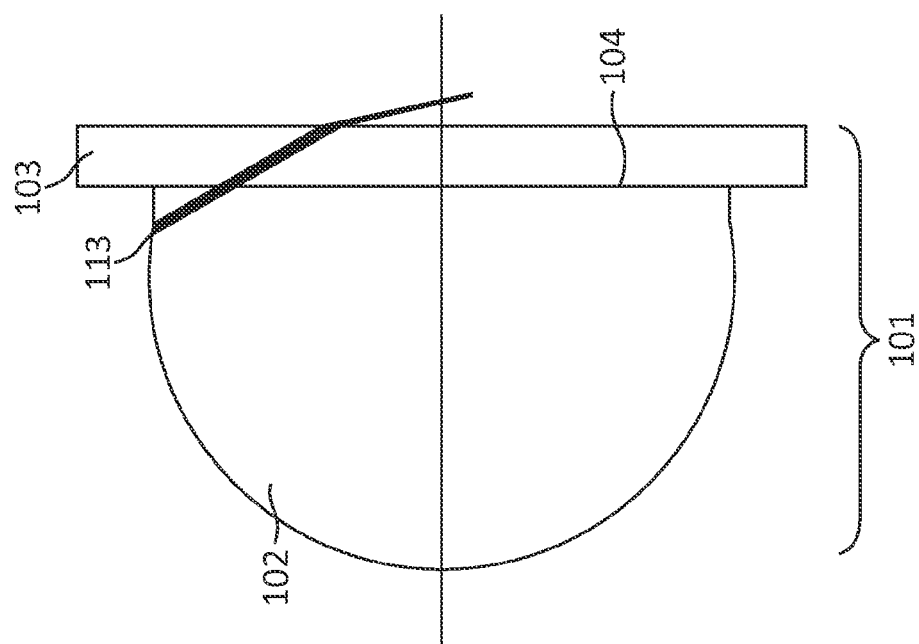
FIG. 5 shows a beam path through an objective, according to an embodiment of the invention, in a set-up according to FIG. 3b in a general view (FIG. 5a) and in a detailed view of the front lens group (FIG. 5b).
Figure 5A:
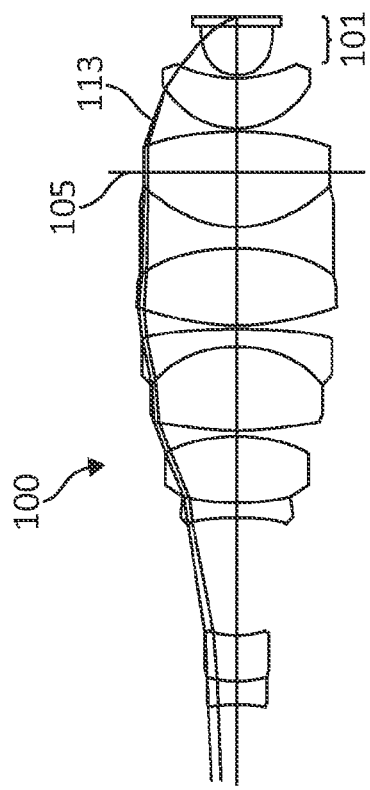

Finally, FIG. 5 shows the beam path 113 in an oil immersion objective 100, according to an embodiment of the invention, with an illumination according to FIG. 3b. The beam path 113 of small aperture and a large angle of incidence is clearly visible. Once again, the same reference numerals as in FIG. 2 have been selected, so that, in this regard, reference can again be made to this drawing FIG. 5b is an enlarged view of the front lens group 101 from FIG. 5a. It can be clearly seen that the beam path 113 penetrates a small region of the contact surface 104 in the direction of the preparation 7. The beam path 113 strikes the preparation 7 at a large angle of incidence, thereby generating evanescent illumination at this point. The high power density in the small region of the contact surface 104 would again cause damage to the conventional cement. The absence of cement on this contact surface 104 prevents this disadvantage.

Figure 6:
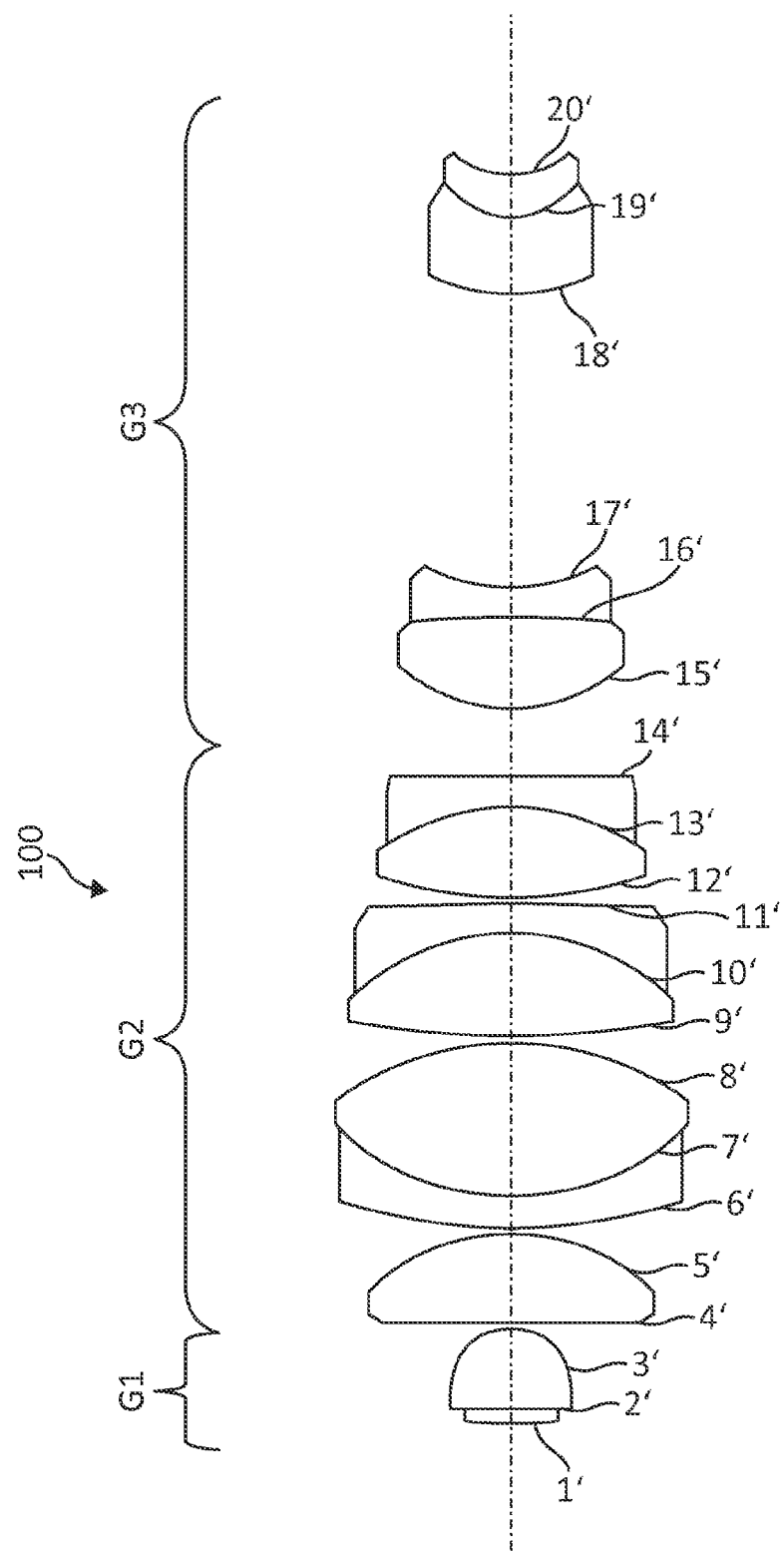
FIG. 6 shows an oil immersion objective, according to an embodiment of the invention, which comprises three lens groups.

FIG. 6 shows an oil immersion objective 100, according to an embodiment of the invention, having three lens groups G1, G2 and G3. Lens group G1 is the front lens group 101, which is as discussed at length above. The second lens group G2 comprises a unipotential lens and three doublets, that is, three cemented lens pairs. Lens group G3 comprises the remainder of the objective, this being two doublets in this case. The faces of the individual optical elements are numbered consecutively in the conventional manner. These are faces 1' to 20'. The table below sets out, in the conventional manner, the relevant radii of curvature (R in mm), the distances (d in mm) along the optical axis, the refractive indices ($n_e$) and the dispersions ($v_e$) for these faces (F1) 1' to 20'.

| F1 | R/mm | d/mm | $n_e$ | $v_e$ | |
|---|---|---|---|---|---|
| 1' | Planar | 0.53 | 1.62068 | 49.54 | G1 |
| 2' | Planar | 3.15 | 1.57098 | 70.93 | |
| 3' | −2.45300 | 0.20 | | | |
| 4' | 257.52650 | 3.50 | 1.43985 | 94.49 | G2 |
| 5' | −7.78480 | 0.20 | | | |
| 6' | 20.91340 | 1.20 | 1.80811 | 46.32 | |
| 7' | 9.61610 | 6.00 | 1.57098 | 70.93 | |
| 8' | −11.15490 | 0.25 | | | |
| 9' | 35.64880 | 4.00 | 1.59447 | 67.97 | |
| 10' | −8.96400 | 1.20 | 1.64133 | 42.20 | |
| 11' | −84.89670 | 0.20 | | | |
| 12' | 15.85320 | 3.50 | 1.43985 | 94.49 | |
| 13' | −8.67990 | 1.20 | 1.88815 | 40.52 | |
| 14' | 219.36250 | 2.60 | | | |
| 15' | 6.44310 | 3.50 | 1.43985 | 94.49 | G3 |
| 16' | −49.92590 | 1.20 | 1.71616 | 53.61 | |

-continued

| F1 | R/mm | d/mm | $n_e$ | $v_e$ |
|---|---|---|---|---|
| 17' | 6.81440 | 11.40 | | |
| 18' | 7.56730 | 3.02 | 1.48914 | 70.22 |
| 19' | 2.99810 | 1.63 | 1.72310 | 29.28 |
| 20' | 3.40630 | | | |

The objective described hereby is an aplanatic achromat having a focal length of 1.25 mm and a numerical aperture of NA=1.43. This focal length, in conjunction with a standard tube lens with a focal length of 200 mm, produces magnification of 160× in the intermediate image. Upon use of a cover glass with a thickness of 0.17 mm, the working distance is W=0.10 mm. Field flattening is optimised for use with a camera.

To advantageously correct aberrations, lens groups G1 to G3 meet the following conditions (f=focal length):

$$3.0 < f(G1)/f(\text{objective}) < 4.0$$

$$6.0 < f(G2)/f(\text{objective}) < 7.0$$

$$-15.5 < f(G3)/f(\text{objective}) < -14.5.$$

FIG. 7 shows the imaging power of such an objective, with FIG. 7a showing the longitudinal aberration and FIG. 7b showing the OCR (offence against sine-condition).

Curves are applied for various wavelengths e=546 nm, g=436 nm, C'=644 nm and F'=480 nm. In FIG. 7a, DOF denotes the depth of focus and $NA^2$ the numerical aperture in the squared scale. The offence against sine-condition in FIG. 7b is applied in percent, as per convention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Optical axis
2 Light field diaphragm aperture
3 Illumination lens
4 Splitter mirror
5 Entrance pupil of the objective
6 Objective
7 Preparation
8 Tube lens
9 Image plane
11 Tilt mirror
12 Scanocular
13 Transport optics
100 Oil immersion objective
101 Front lens group
102 Hyper-hemisphere
103 Plane parallel plate
104 Contact surface
105 Objective pupil
111 Beam path
112 Beam path
113 Beam path
G1, G2, G3 Lens groups
1'-20' Lens faces

The invention claimed is:

1. A microscope immersion objective having a numerical aperture of NA>1.36, the microscope immersion objective comprising:
a front lens group disposed at an object end of the microscope immersion objective, the front lens group including:
a first optical element, the first optical element being a plane parallel plate comprising two parallel planar sides, and
a second optical element being disposed, relative to the first optical element, distal to the object of the microscope immersion objective, the second optical element comprising:
a hyper-hemisphere portion, and
a planar side portion,
wherein at least one of the two parallel planar sides of the plane parallel plate and the planar side portion of the second optical element each have a smooth planar surface, and
wherein the smooth planar surface of the at least one of the two parallel planar sides of the plane parallel plate is wrung together with the smooth planar surface of the planar side portion of the second optical element.

2. The microscope immersion objective of claim 1, wherein the plane parallel plate projects beyond the planar side of the hyper-hemisphere.

3. The microscope immersion objective of claim 2, wherein the plane parallel plate enables mechanical retention of the front lens group.

4. The microscope immersion objective of claim 1, wherein a magnification of the microscope immersion objective is greater than 50x and less than 200x.

5. The microscope immersion objective of claim 1, wherein the numerical aperture is NA>1.40.

6. The microscope immersion objective of claim 1, wherein a thickness of the plane parallel plate is not greater than 1 mm.

7. The microscope immersion objective of claim 1, wherein the microscope immersion objective is a plan apochromatic objective.

8. The microscope immersion objective of claim 1, further comprising:
a second lens group including a unipotential lens and a cemented lens having three cemented surfaces, and
a third lens group including a remainder of the objective;

wherein a focal length f (G1) of the front lens group and a focal length f (objective) of the microscope immersion objective satisfy the condition: $3.0<f(G1)/f(objective)<4.0$, wherein a focal length f (G2) of the second lens group and the focal length f (objective) of the microscope immersion objective satisfy the condition: $6.0<f(G2)/f(objective)<7.0$, and wherein a focal length f (G3) of the third lens group and the focal length f (objective) of the microscope immersion objective satisfy the condition: $-15.5<f(G3)/f(objective)<-14.5$.

9. A microscopy method comprising:
providing a microscope immersion objective having a numerical aperture of NA>1.36, the microscope immersion objective comprising a front lens group disposed at an object end of the microscope immersion objective, the front lens group including:
  a first optical element, the first optical element being a plane parallel plate comprising two parallel planar sides, and
  a second optical element being disposed, relative to the first optical element, distal to the object of the microscope immersion objective, the second optical element comprising:
    a hyper-hemisphere portion, and
    a planar side portion,
wherein at least one of the two parallel planar sides of the plane parallel plate and the planar side portion of the second optical element each have a smooth planar surface, and wherein the smooth planar surface of the at least one of the two parallel planar sides of the plane parallel plate is wrung together with the smooth planar surface of the planar side portion of the second optical element; and using the microscope immersion objective for TIRF microscopy or localizing microscopy.

10. The microscope immersion objective of claim 1, wherein the smooth planar surface of the at least one of the two parallel planar sides of the plane parallel plate and the smooth planar surface of the planar side portion of the second optical element are rigidly interconnected as the sole result of molecular forces of attraction.

11. The microscope immersion objective of claim 1, wherein the smooth planar surface of the at least one of the two parallel planar sides of the plane parallel plate and the smooth planar surface of the planar side portion of the second optical element are wrung together without any microstructuring.

12. The microscopy method of claim 9, wherein the smooth planar surface of the at least one of the two parallel planar sides of the plane parallel plate and the smooth planar surface of the planar side portion of the second optical element are rigidly interconnected as the sole result of molecular forces of attraction.

13. The microscopy method of claim 9, wherein the smooth planar surface of the at least one of the two parallel planar sides of the plane parallel plate and the smooth planar surface of the planar side portion of the second optical element are wrung together without any microstructuring.

* * * * *